United States Patent [19]

Schnettler

[11] Patent Number: 5,224,511

[45] Date of Patent: Jul. 6, 1993

[54] SPRING-LOADED SAFETY VALVE

[75] Inventor: Armin Schnettler, Grevenbroich, Fed. Rep. of Germany

[73] Assignee: Babcock Sempell AG, Korschenbroich, Fed. Rep. of Germany

[21] Appl. No.: 427,120

[22] PCT Filed: Apr. 22, 1988

[86] PCT No.: PCT/EP88/00342

§ 371 Date: Oct. 23, 1989

§ 102(e) Date: Oct. 23, 1989

[87] PCT Pub. No.: WO88/08496

PCT Pub. Date: Nov. 3, 1988

[30] Foreign Application Priority Data

Apr. 25, 1987 [DE] Fed. Rep. of Germany ....... 3713974

[51] Int. Cl.⁵ .............................................. F16K 21/10
[52] U.S. Cl. .................................. 137/514.3; 137/514
[58] Field of Search .................. 137/514, 514.3, 514.5

[56] References Cited

U.S. PATENT DOCUMENTS

| 957,311 | 5/1910 | Davis et al. ................. 137/514.3 X |
| 2,392,009 | 1/1946 | Stern .................................. 137/514.3 |
| 3,048,188 | 8/1962 | Hunter ......................... 137/514.3 X |
| 3,789,873 | 2/1974 | Westwood ...................... 137/514.3 |
| 3,850,405 | 11/1974 | White ........................... 137/514.3 X |
| 4,018,248 | 4/1977 | Carr ................................. 137/514.3 |
| 4,756,334 | 7/1988 | Panet et al. ..................... 137/514.3 |

FOREIGN PATENT DOCUMENTS

| 0032346 | 7/1981 | European Pat. Off. . |
| 3010520 | 9/1981 | Fed. Rep. of Germany . |
| 244923 | 12/1925 | United Kingdom ............. 137/514.3 |
| 258163 | 9/1926 | United Kingdom ............. 137/514.3 |

Primary Examiner—John Rivell
Attorney, Agent, or Firm—Lowe, Price, LeBlanc & Becker

[57] ABSTRACT

A spring-loaded safety valve provided with an integrated damping element that achieves a damping effect by the dissipative action of a shearing current and which involves a single-layer or multiple-layer virtually coaxial arrangement of tubes or active surfaces that can be moved telescopically with respect to one another.

10 Claims, 5 Drawing Sheets

SPRING-LOADED SAFETY VALVE

DESCRIPTION

The invention relates to a spring-loaded safety valve.

Such a safety valve is described in EP-A1-0 032 346. In the latter, the movable part of the damping device connected to the valve spindle is a piston. The latter displaces hydraulic oil by way of a restrictor between two cylinder working chambers, which it defines together with the cup-shaped stationary damper part receiving it.

However, hydraulic dampers operating with restrictors are sensitive to impurities and on account of the friction between the piston and cylinder do not work in a satisfactory reproducible manner, in particular at the time of transition between static friction to sliding friction.

In the known safety valve, the starting point of damping and the magnitude of damping also cannot be adjusted. However, this would indeed be desirable in safety valves, in which the forces acting on the valve spindle vary very quickly with the opening displacement in the vicinity of the closing position.

A further spring-loaded safety valve is described in the Journal VGB Kraftwerkstechnik (VGB Power Station Technology), volume 8, August 1984, pages 746 onwards. In the latter, the damping device operating on the spindle comprises brake shoes with a spherical outer surface engaging on the outer surface of the spindle, which brake shoes are biased against the outer surface of the spindle by a spring by way of conical pressure members. The damping device thus operates according to the principle of solid friction, and with this damping device one can partly eliminate the harmful effects of valve vibrations. Valve vibrations of this type occur in particular due to the reactions of pressure waves. The latter occur for example at the time of each unstable movement of the valve spindle and of the closure member supported thereby.

The system, which is formed by the safety valve, the valve supply pipe leading to it and the blow-off pipe leading away from it, is capable of the selfexcitation of vibrations, the initiation being able to take place due to small disturbances, which occur in the pipes or are transmitted by way of the latter. The self-damping of this system is low in comparison with the energy which is inherent in the flow medium to be protected by the safety valve.

If the system formed by the pipes and the safety valve begins to vibrate, then the safety valve acts as an unstable oscillator. With these vibrations, pressure amplitudes may occur in the pipes, which far exceed the limit of stability or the design limit of the pipes.

In this known safety valve, the damping device operates in a manner which can promote the occurrence of vibrations, since in the case of large disturbances, due to which the static friction between the brake shoes and the outer surface of the spindle is overcome, a surplus of force is produced, which cannot be absorbed by the constant sliding friction which is less in comparison with the static friction. This surplus of force leads to a jerky movement of the closure member, which once more leads to the production of compressional vibrations in the pipe system. One thus obtains an unfavourable feedback to the safety valve. This transition between static friction and sliding friction takes place for each reversal of movement of the valve spindle. The damping is furthermore independent of the speed of movement of the valve spindle, so that with respect to a vibration cycle, independent of the effective spindle speed, approximately a constant portion of the kinetic energy present as a whole is dissipated. This means that high frequencies can be less well damped.

On account of the unavoidable static friction determined by the damping principle of this known safety valve, even the static force management of the safety valve is influenced unfavourably by the biasing of the brake shoes. The response point of the safety valve shifts in a manner which cannot be controlled accurately. Also the friction surfaces must be protected against corrosion, which means additional maintenance expenditure. In the case of a forced vibration, there is the danger of mechanical and/or thermal damage to the valve spindle.

Furthermore, vibration-damping bearing members for the erection of machines are known (cf DE-A1-30 10 520), which located inside a helical spring comprise a damper, whereof cylindrical damper parts able to move one with respect to the other define working surfaces lying opposite each other at a small distance apart, between which a viscous medium is poured. The latter is loaded in shear at the time of relative movement of the damper parts. In such bearing members, exact adjustability of the starting point and magnitude of damping is of no interest.

The present invention therefore intends to develop a safety valve so that even high frequency vibrations of the moving valve parts, which occur at low amplitude, are well damped independent of manufacturing tolerances of the closure part, valve seat and valve spindle.

This object is achieved according to the invention by a safety valve described hereinafter.

In the safety valve according to the invention, the damping of the vibrations of the moving valve parts takes place due to the fact that a thin layer of viscous medium is loaded in shear. On account of the internal friction of the viscous medium, the kinetic energy (and thus in the course of time also the potential energy) of the system capable of vibrating and formed by the moving valve parts, the spring arrangement operating on the spindle, the pipe parts and the flow means located therein, is dissipated.

For the shearing of thin layers of many viscous media, it is not necessary to overcome any great initial inhibiting action, so that the damping of the safety valve according to the invention even becomes effective at very low amplitudes. In so far that thin layers of viscous media have a serious initial inhibiting action (in particular thixotropic viscous media), such an initial inhibiting action is followed by a shearing inhibiting action exceeding the former, so that the force/displacement curve as a whole has no downwardly sloping sections, which favour the selfexcitation of vibrations.

Since, in the case of a shearing load on a layer of viscous medium, it is a question of an internal material load, the surface quality of the valve spindle plays no significant role. Even if the roughness of the spindle surface lies above the standard, the working characteristic of the special damping device provided in the safety valve according to the invention is unchanged.

The energy absorbed by the damping device in the safety valve according to the invention, from the beginning of an incipient self-excitation of the system which is capable of vibrating, increases with the speed of movement of the valve spindle, so that greater quantities of energy are dissipated more quickly.

In the safety valve according to the invention, additional expenditure for maintenance is also not required, since current viscous media protect the working surfaces simultaneously against corrosion in a satisfactory manner. The damping device is also free from wear. The heat built up in the dissipation of energy can also be discharged over a large surface area by way of working surfaces having large dimensions, so that no overheating of the valve spindle or of the damper parts occurs.

In the safety valve according to the invention, the dissipation of the energy inherent in the system which is capable of vibrating, takes place by shearing of the viscous medium, which is located between the working surfaces The corresponding shearing work is irreversible and due to this one obtains macroscopically a non-resilient reaction force of the damping device on the valve spindle. As in the case of solid friction, some viscous media have a property comparable with static friction: at low shearing speeds, the medium behaves in a particularly viscous manner. With an increasing shearing speed, the shearing force increases in a manner other than in the case of solid sliding friction, but degressively and does not decrease suddenly, as in the case of the transition from static friction to sliding friction. In the safety valve according to the invention, the damping effect is thus established continuously and increases degressively without points of sudden irregularity. Vibrations at low amplitude are damped effectively without the response pressure of the safety valve being changed to a relevant extent.

In a manner different from a damping device operating purely mechanically, in the safety valve according to the invention, one can vary the extent of damping in a manner which can be predetermined and precalculated satisfactorily, without the response pressure of the safety valve being changed, and indeed by way of the following parameters:

the thickness of the gap which lies between the working surfaces of the damper parts and is filled with the viscous medium;
the size of the overlapping surface between the layer of viscous medium and opposing damper parts;
the viscosity or resting penetration (DIN 51 804, sheet 1) of the viscous medium used.

The coaxial arrangement of cylindrical working surfaces is an advantage with regard to a shearing load on the layer of viscous medium, which load is constant in the peripheral direction. Thus, in addition, the two damping parts can additionally take over guiding tasks on the section of the valve spindle co-operating therewith, particularly if one works with a small distance between the working surfaces of the damper parts, or the working surfaces have large axial dimensions.

Due to the cup shape of the outer damper part, it is ensured that the viscous medium cannot emerge from the damping device under the action of gravity, even when it has been used for a very long time at high temperatures.

In a safety valve according to another embodiment, with furthermore compact external dimensions, the damping coefficients are clearly increased, since one now has a plurality of pairs of co-operating working surfaces.

With the development of the invention according to a further embodiment, the extent of damping can be modified depending on the distance covered by the valve spindle from the inoperative position.

In a damping device, which comprises a cup-shaped outer damper part, in the case of a quick-opening valve, the inner damper part is moved towards the base of the outer damper part; a corresponding volume of viscous medium must flow away through the gaps lying between the working surfaces. Consequently an additional damping action is achieved by throttling. Where such an additional damping effect is not desired, one can construct the volume of the outer damper part lying below the lower edge of the inner damper part in the inoperative position of the safety valve, as a dead space. The tight, elastically compressible dead space member allows the relative movement between the inner damper part and the outer damper part, but prevents the entry of viscous medium into the lower section of the cup-shaped damper part. The elasticity constant of the material, from which the dead space member is manufactured, does not need to be great, since at the time of separation of the damper parts, the dead space member is once more expanded forcefully. However, if desired, one can also use dead space members with a somewhat greater elasticity constant, in order to obtain an additional damping spring.

Dead space members can be produced and incorporated very simply.

If one uses as the dead space member, a filling of compressible granules, then one can produce dead space members of the most varied dimensions and geometry, without producing corresponding foam moulds, economically even in small series.

Also, with the development of the invention according to another embodiment, it is ensured that at the time of the relative movement of the damper parts, displaced viscous medium does not produce any additional throttling effect, it being simultaneously guaranteed that this medium discharged by way of overflow grooves, cannot escape from the damping device.

On account of the direct connection between the valve spindle and outer damper part, the safety valve according to a further embodiment has a particularly simple mechanical construction.

If one chooses that the working surface be large, then on the one hand one has very large surfaces for receiving the dissipation heat. In addition, a damping device with large working surfaces also has low inherent elasticity, so that one obtains damping which is established very directly.

On account of the adjustability of the initial inoperative position of the damper parts, the damping properties can be adjusted simply at the place of use by taking into consideration the lengths of the pipe sections connected to the safety valve at the inlet side and outlet side.

The invention will be described hereafter in detail by means of embodiments referring to the drawings, in which.

Figure 1:
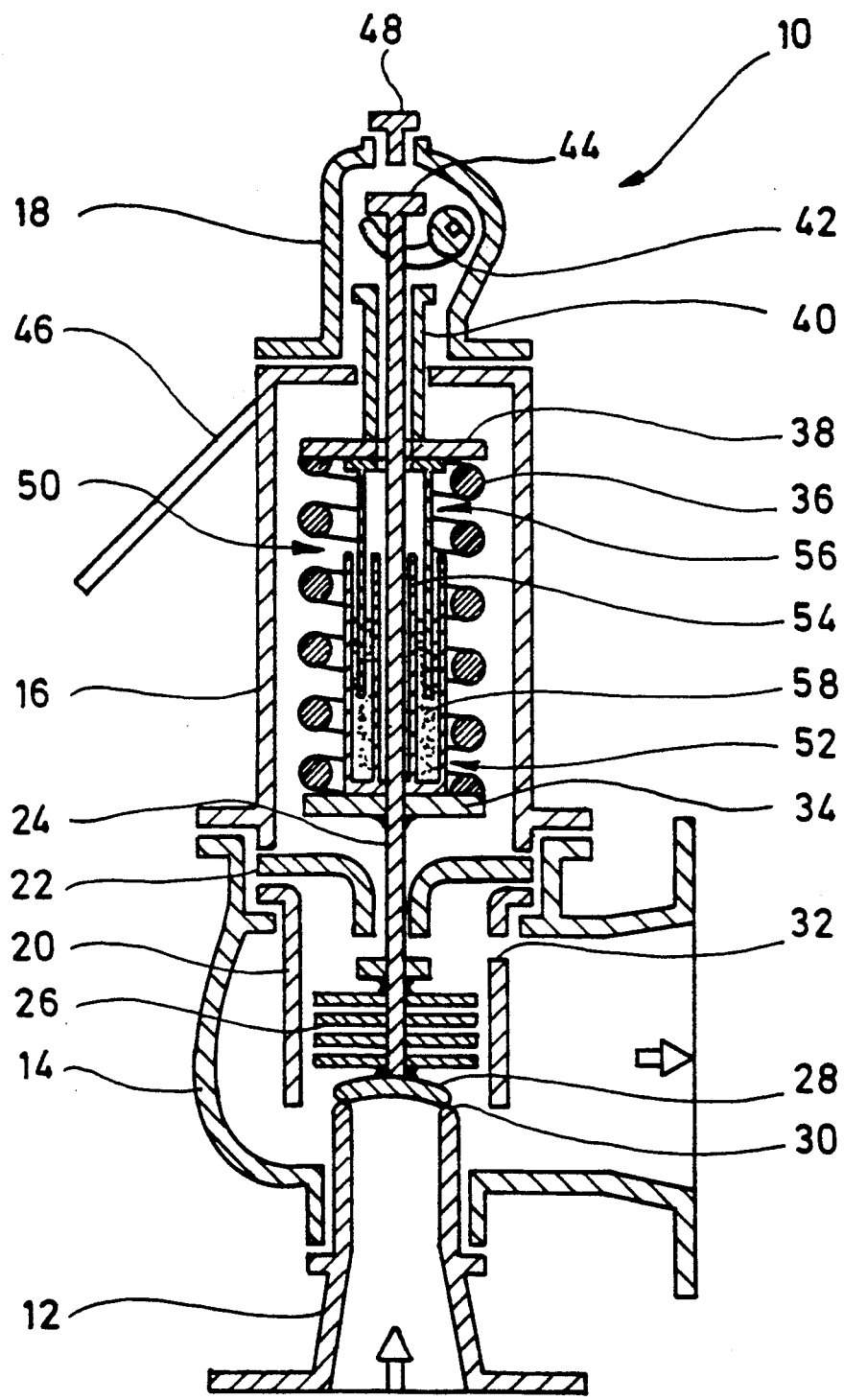
FIG. 1 is an axial section through a spring-loaded safety valve with integrated damping device.

FIG. 1 is a diagrammatic axial section through a spring-loaded safety valve 10 with a multi-part valve housing, to which an inlet housing part 12, an outlet housing part 14, a spring chamber housing part 16 and a cover 18 belong. Clamped in a tight manner between the housing parts 14, 16 are a stroke assisting cylinder 20 and an intermediate wall 22.

Guided in a tight manner through the intermediate wall 22 is a valve spindle 24, which at the lower end supports a stroke-assisting piston 26 and a closure member 28. The latter co-operates with a valve seat 30 supported by the inlet housing part 12.

As shown in FIG. 1, the working chamber of the stroke-assisting cylinder 20 lying above the stroke-assisting piston 26 is permanently connected by way of an opening 32 to the valve outlet.

In its section lying within the housing part 16, the valve spindle 24 supports a spring seat 34, on which the lower end of a helical spring 36 engages. Its upper end is supported on a spring seat 38, which is supported by an adjusting sleeve 40 surrounding the valve spindle 24. On its outer side the adjusting sleeve 40 comprises a screw thread and can be screwed into a mating thread in the covering wall of the spring chamber housing part 16.

Inside the bell-shaped cover 18, an opening finger 42 is mounted to rotate about a pivot point perpendicular to the plane of the drawing, which finger can engage on a driving head 44 of the valve spindle supported by the end of the valve spindle 24. The opening finger 42 is connected in a non-rotary manner to an actuating lever 46. A screw 48 is screwed into the uppermost section of the cover 18. This screw can be replaced by a longer special screw, which serves for the positive locking of the closure member 28 in the closed position.

Provided inside the helical spring 36 is a damping device designated generally by the reference numeral 50, which prevents high frequency vibrations of the moving valve parts at the time of rapid opening and closing of the safety valve, which lie typically in the frequency range of 100 Hz to a few kHz.

Belonging to the damping device 50 is a cup-shaped outer damper part 52, which is securely connected to the lower spring seat 34 of the helical spring 36. A tubular wall 54 extends from the base of the damper part 52 upwards coaxially with respect to the axis of the spindle and engaging with mutual radial clearance in the annular gap formed between the tubular wall 54 and the peripheral wall of the damper part 52 is an inner damper part 56. The inner damper part 56 is suspended from the upper spring seat 38 and is securely connected thereto.

The annular space determined by the outer damper part 52 is filled with a highly viscous silicone grease 58, which contains graphite as a filler component or as exclusive filler. The level of the silicone grease 58 extends above the lower edge of the cylindrical inner damper part 56. As shown in FIG. 1, the lower edge of the inner damper part 56 terminates by a distance above the base of the outer damper part 52, which is clearly greater than the working stroke of the safety valve 10, which is determined by the abutment of the stroke-assisting piston 26 against a central tubular section of the intermediate wall 22 which is drawn downwards.

The inner surface of the peripheral wall of the outer damper part 52 and the outer surface of the cylindrical inner damper part 56 as well as the inner surface of the inner damper part 56 and the outer surface of the tubular wall 54 together form two pairs of working surfaces, between which a thin layer of silicone grease 58 is respectively located. The thickness of this layer is shown in an exaggerated manner in the drawing; in practice the thickness of the layer amounts to approximately 0.1 to approximately 1 mm.

With unchanged geometry of the two damper parts 52, 56, one can control the damping behaviour of the damping device 50 by way of the nature and viscosity of the viscous medium with which the annular chamber of the outer damper part 52 is filled in the same way as by way of the filling height of this medium. In addition, one can influence the damping devices by way of the thickness of the gaps located between the working surfaces of the damper parts 52, 56.

In the safety valve shown in FIG. 1, the intensity of damping increases with the opening displacement of the closure member 28, since an increasingly larger section of the inner damper part 56 is immersed in the silicone grease 58, due to which the size of the layer of grease loaded in shear is increased correspondingly. The percentage increase in the damping clearly once more depends on the filling height of the silicone grease 58. If the silicone grease 58 for example was filled solely up to just above the lower edge of the damper part 56, then the safety valve 10 is in the closed position illustrated in FIG. 1, then one would have a very considerable percentage increase in the damping; under the circumstances illustrated in FIG. 1, the damping increases solely by less than 20% from the closed position of the valve to the fully open position.

Figure 2:
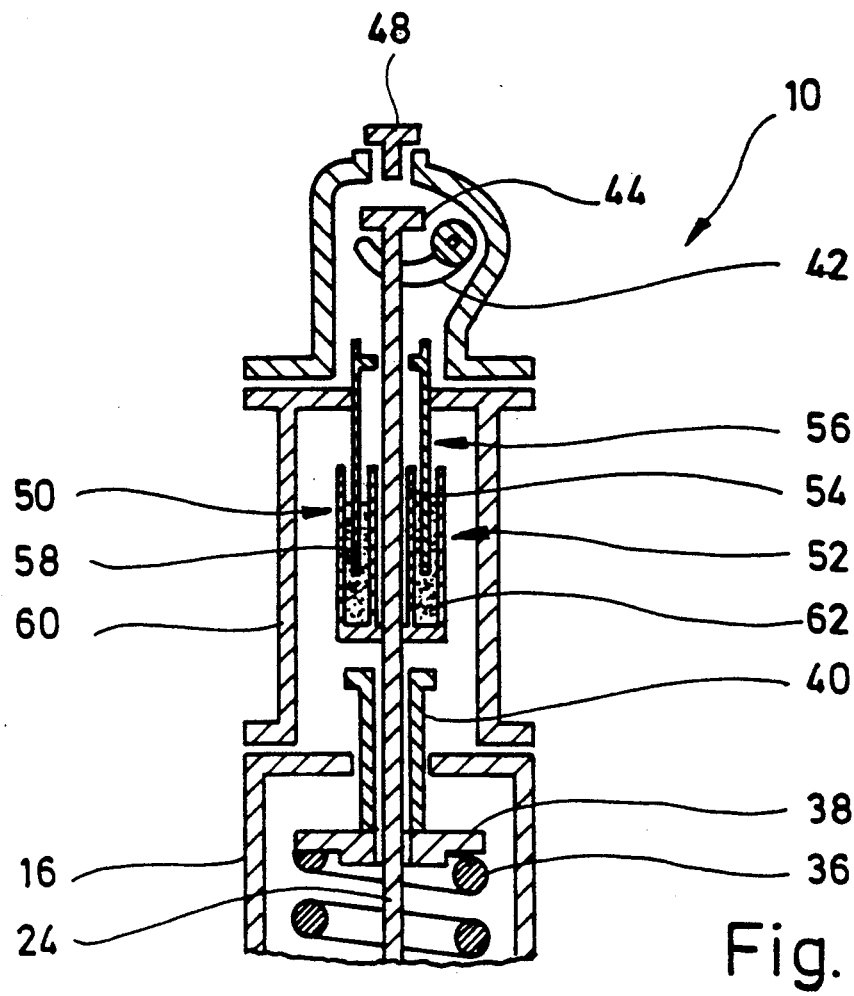
FIGS. 2 and 3 are axial partial sections through modified spring-loaded safety valves with integrated damping device.

In the modified safety valve illustrated in FIG. 2, the damping device is attached to the end of the spring chamber. This embodiment is thus particularly well suited for the subsequent equipping of a damping device on a spring-loaded safety valve already in use. Attached to the spring chamber housing part 16 is a damping housing part 60, which then supports the cover 18. The cup-shaped outer damper part 52 is attached to the section of the valve spindle 24 located below the driving head 44 and the cylindrical, inner damper part 56 is arranged to be axially adjustable in the upper end wall of the damping housing part 60 by way of a threaded connection which is not shown in detail.

In the damping device 50 shown in FIG. 2, also inserted in the lowermost section of the annular chamber defined by the outer, cup-shaped damper part 52 is a dead space member 62, which consists of a foamed, elastic synthetic material having closed pores. In the closed position of the safety valve, the dead space member 62 extends as far as the lower edge of the inner damper part 56 and prevents the space located below the lower edge of the inner damper part 56 from filling with silicone grease 58. On the other hand, the dead space member 62 allows the relative movement between the lower edge of the damper part 56 and the base of the damper part 52 virtually without hindrance, if a soft foam material is used for the dead space member 62. In the damping device according to FIG. 2, one thus has a size of the layers of silicone grease 58 which are loaded in shear, which is independent of the spindle displacement.

Figure 3:
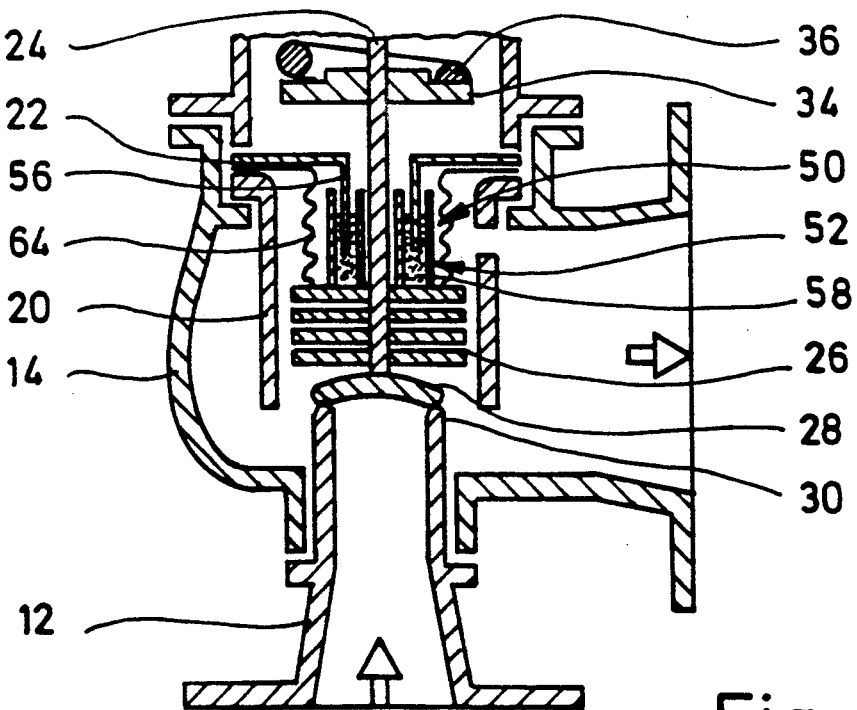

The embodiment according to FIG. 3 differs from the afore-described embodiments due to the fact that the damping device 50 is located in the immediate vicinity of the stroke-assisting piston 26. Provided for sealing the damping device 50 with respect to the medium to be controlled are bellows 64, which surround the outer damper part s? in a tight manner and together with the intermediate wall 22 supporting the inner damper part 56 is braced tightly with the housing parts 14 and 16.

Figure 4:
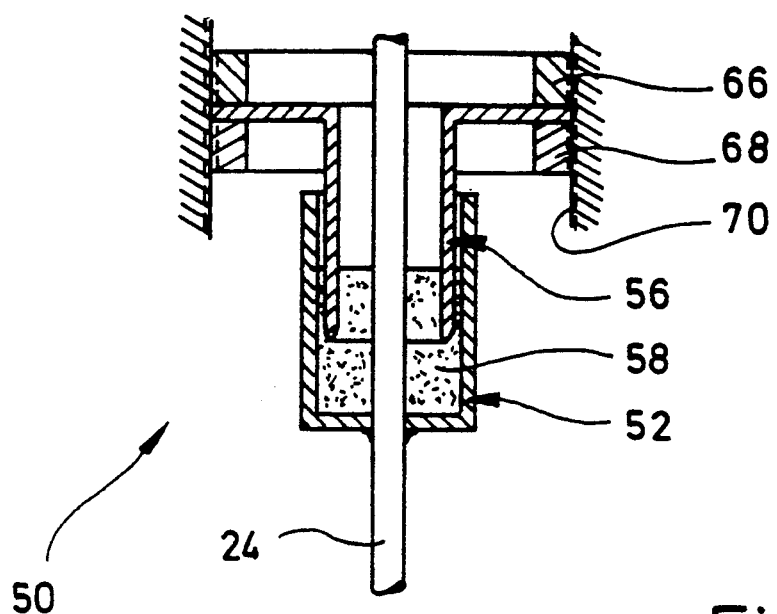
FIGS. 4 and 5 show two embodiments for damping devices for a spring-loaded safety valve with displacement-dependent damping.

In the modified damping device 50 illustrated in FIG. 4, the cylindrical inner damper part 56 is at a slight distance from the peripheral wall of the outer damper part 52 and at a great distance from the outer surface of the valve spindle 24. On opening the safety valve, silicone grease 58 to be displaced from the lower section of the cup-shaped outer damper part 52 may thus travel upwards over a large cross-section, so that the damping action is based virtually exclusively on the shearing of the thin layer of grease, which is enclosed between the outer surface of the inner damper part 56 and the inner surface of the outer damper part 52.

The inner damper part 56 is positioned axially by threaded rings 66, 68, which are adjustable in a threaded bore 70 of the valve housing, in order to be able to adjust the initial value of damping without changing the mass of silicone grease 58 poured in.

Figure 5:
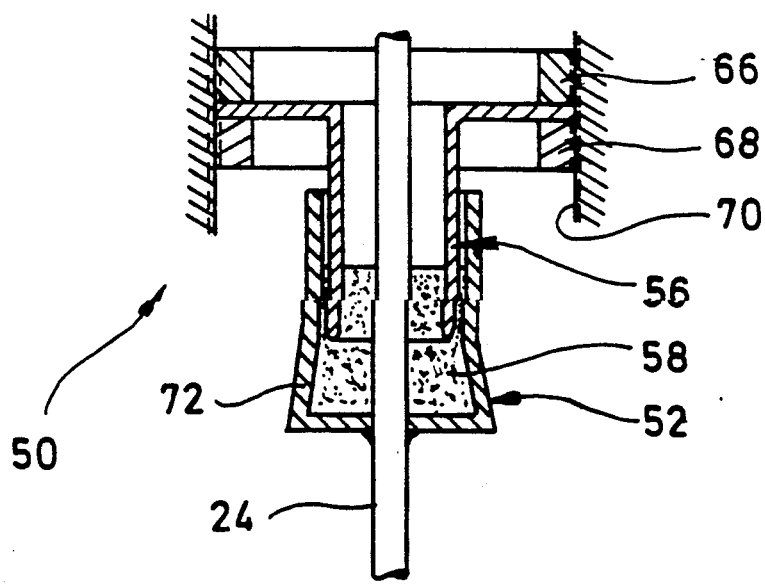

The damping device illustrated in FIG. 5 is very similar to that of FIG. 4, solely the outer damper part 52 widens out conically towards its base, as shown at 72. When the inner damper part 56 enters the lower section 72 of the outer damper part 52, one thus has locally an increasingly greater thickness of the layer of silicone grease 58 and these layer sections thus contribute percentagewise correspondingly less to damping. Thus the displacement-dependent increase in damping, as it is obtained in the damping device according to FIG. 4, is reduced.

One obtains a variation in the penetration depth of the damper part 56 in the silicone grease 58. In this case this variation of the penetration depth can be positive or negative, depending on whether the thread 82 has the same direction of rotation as that of the threaded bore 78 or the opposite direction of rotation. The extent of the displacement-dependent portion of the damping can be adjusted by way of the pitch of the thread 82 and of the threaded section 80.

Figure 6:
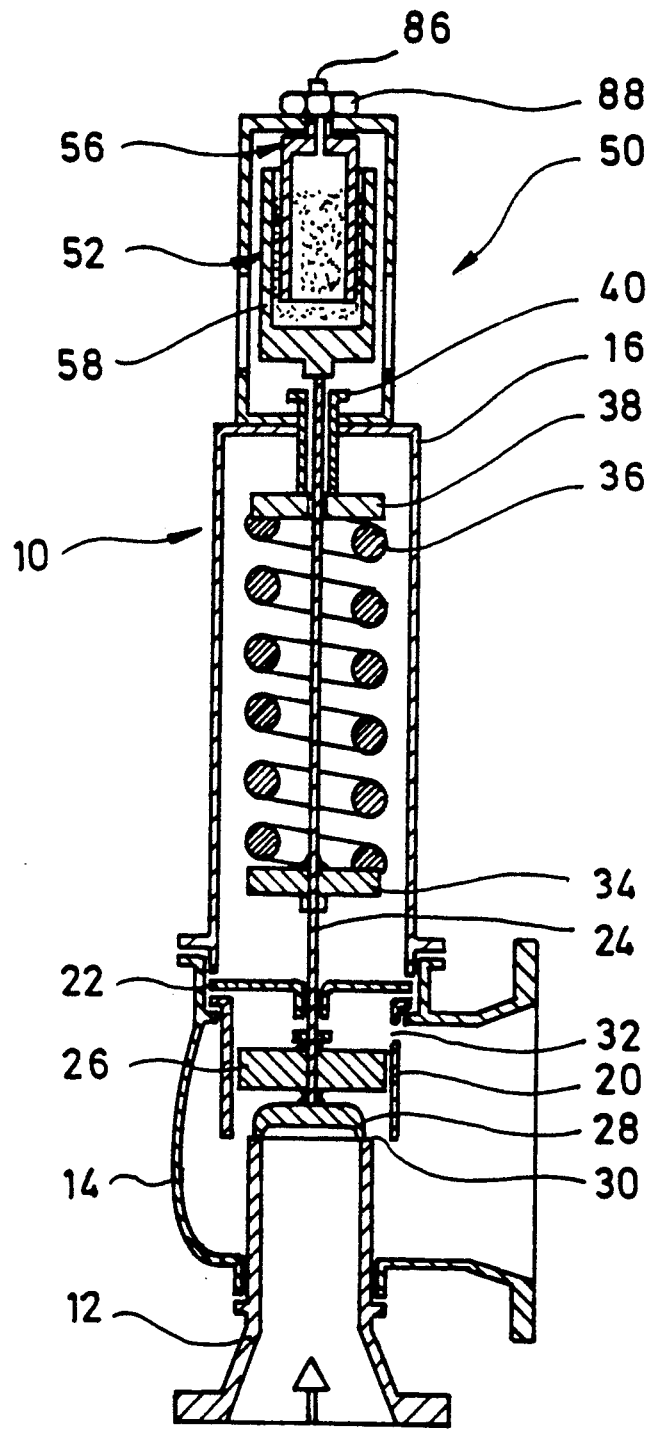
FIG. 6 is a similar axial sectional view to FIG. 1, in which a spring-loaded safety valve with installed damping devices shown.

Also, in the safety valve illustrated in FIG. 6, components which were described above with reference to FIGS. 1 to 3 in a functionally similar manner, are again given the same reference numerals. These valve parts will not be described again in detail hereafter.

In the safety valve shown in FIG. 6, the cup-shaped outer damper part 52 is screwed to the upper end of the valve spindle 24. The inner damper part 56 again engages from above in the damper part 52 and on its base supports a threaded bolt 86, which is screwed through the upper end wall of a cover 18 constructed in the shape of a lantern and can be locked in the respectively desired axial position by a nut 88.

Figure 7:
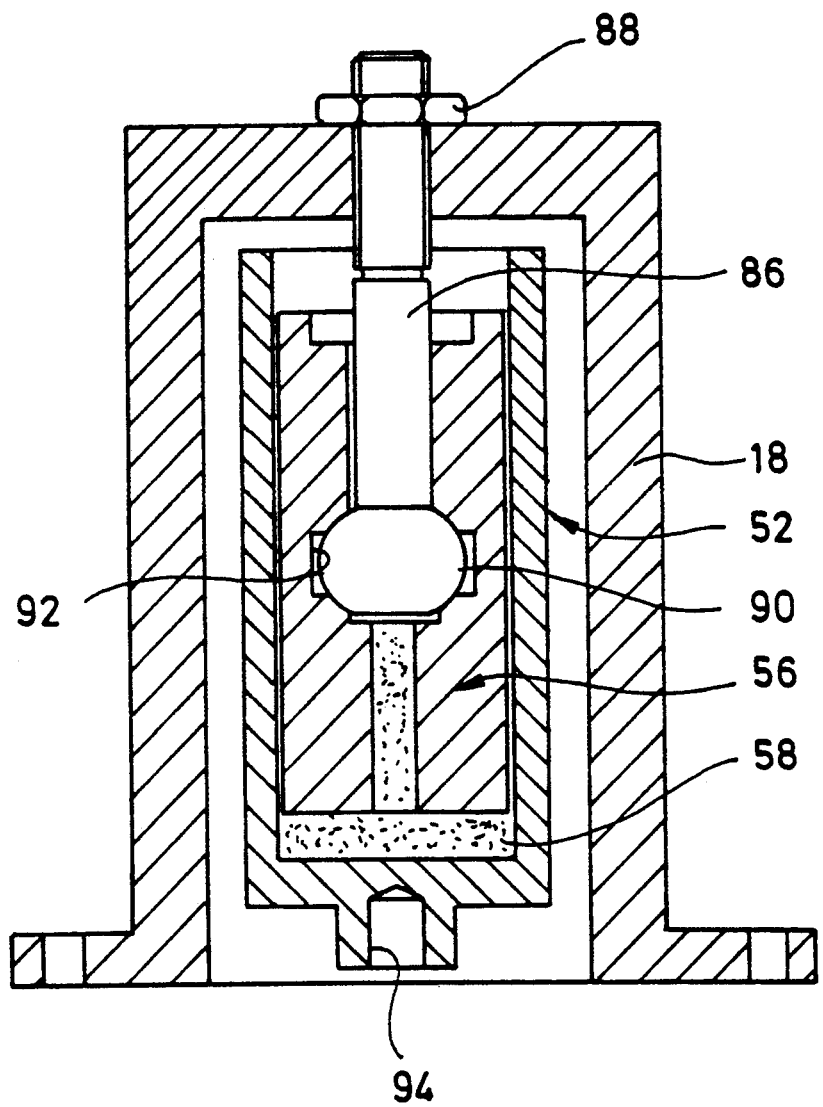
FIG. 7 is an enlarged axial section through a modified attachable damping device for a sprig-loaded safety valve.

The arrangement of the damping device at the end of the valve spindle 24, shown in FIG. 6, is particularly advantageous for subsequently equipping safety valves already in use. Also the maintenance of the damping device and the adjustment of its damping properties can be carried out particularly easily at the place of use. Particularly with attached damping devices, which are intended to be used together with already installed safety valves, it is difficult to guarantee complete parallelism between the damper axis and the axis of the valve spindle 24. FIG. 7 shows an attachable damping device, which allows compensation for alignment errors between the damper axis and valve spindle axis. The various damper parts are again provided with the reference numerals already used above.

The supporting of the inner damper part 56 on the cover 18 of the valve housing no longer takes place by way of a threaded bolt 86 securely connected to the damper part 56; on the contrary, the threaded bolt 86 has a ball 90 attached at its lower end, which engages in an annular groove 92 in the damper part 56. The annular groove 92 and the ball 90 together form a ball and socket joint. The latter allows the damper part 56 to align itself as regards inclination with the axis of the outer damper part 52. In practice, in the embodiment according to FIG. 7, the inner damper part 56 may consist of two segments, the transverse joint face extending through the annular groove 92, in order to facilitate the fitting of the threaded bolt 86 supporting the ball 90 to the inner damper part 56.

In place of a conventional cover, the cover 18 may be provided on a safety valve already in use, in which, moreover, there can solely be located at the free end of the valve spindle 24 a thread, onto which a connecting thread 94 of the outer damper part 52 can then be screwed.

As can be seen readily from the above description of the embodiments, the various damping devices 50 operate completely without static friction. One thus has effective damping even for low vibration amplitudes, whereby according to the construction of the damping device, the damping being able to depend not at all, slightly or greatly on the opening displacement of the valve. For all the embodiments, the damping takes place in a speed-dependent manner.

I contemplate that a viscous medium can be used which does not change its viscosity over a large temperature range, for instance over a temperature range of −50° to 200° C.

I claim:

1. A spring-loaded safety valve with a housing (12 to 16) in which a valve seat (30) is provided between an inlet (12) and an outlet (14) with a closure member (28) which cooperates with the valve seat (30), with a spindle (24) supporting the closure member (28), with a spring arrangement (36) acting on the spindle (24) and with a damping device (50) connected to the spindle (24) which comprises a cup-shaped outer damper part (52) filled with viscous medium (58) and a movable inner damper part (56) coaxial with the outer damper part (52), one of said damper parts being stationary, while the other one is connected to the spindle (24), wherein the damper parts (52, 56) define at least one pair of cylindrical working surfaces positioned opposite each other a small distance apart so as to form therebetween a gap, and a viscous medium (58) occupies at least a part of this gap between these working surfaces, radial dimension of at least one of the working surfaces varying in the direction of relative movement of the damper parts (52-56) so that the width of at least a portion of said gap that contains viscous medium (58) varies in the direction of relative movement.

2. A safety valve according to claim 1 wherein the damper parts (52, 56) comprise a plurality of working walls engaging one in the other in the manner of a comb and between which the viscous medium (58) is located.

3. A safety valve according to claim 1 characterized in that the cup-shaped outer damper part (52) is connected to the spindle (24) for common axial movement, whereas the inner damper part (56) is fixed to the housing (12-18).

4. A safety valve according to claim 1 characterized in that the viscous medium does not substantially change its viscosity over a large temperature range.

5. A safety valve according to claim 1 characterized in that the damping device (50) is located inwardly of the inner surface of the valve housing (12-18) and outwardly from the outer surface of the valve spindle (24).

6. A safety valve according to claim 1 characterized in that said working surfaces have large axial dimensions and at the same time form a guide for the spindle (24).

7. A safety valve according to claim 1 wherein the gap lying between each pair of working surfaces, in which the viscous medium (58) is located has at thickness of less than 1 mm.

8. A safety valve according to claim 1 characterized in that the gap in which the viscous medium (58) is located has a thickness of approximately 0.1 mm.

9. A spring-loaded safety valve with a housing (12 to 16) in which a valve seat (30) is provided between an inlet (12) and an outlet (14) with a closure member (28) which cooperates with the valve seat (30), with a spindle (24) supporting the closure member (28), with a spring arrangement (36) acting on the spindle (24) and with a damping device (50) connected to the spindle (24) which comprises a cup-shaped outer damper part (52) filled with viscous medium (58) and a movable inner damper part (56) coaxial with the outer damper part (52), one of said damper parts being stationary, while the other one is connected to the spindle (24), wherein the damper parts (52, 56) define at least one pair of cylindrical working surfaces positioned opposite each other a small distance apart so as to form therebetween a gap, and a viscous medium (58) occupies at least a part of this gap between these working surfaces, the radial dimension of at least one of the working surfaces varying in the direction of relative movement of the damper parts (52-56) so that the width of at least a portion of said gap that contains viscous medium (58) varies in the direction of relative movement, said viscous medium being a silicon grease admixed with graphite.

10. A spring-loaded safety valve with a housing (12 to 16) in which a valve seat (30) is provided between an inlet (12) and an outlet (14) with a closure member (28) which cooperates with the valve seat (30), with a spindle (24) supporting the closure member (28), with a spring arrangement (36) acting on the spindle (24) and with a damping device (50) connected to the spindle (24) which comprises a cup-shaped outer damper part (52) filled with viscous medium (58) and a movable inner damper part (56) coaxial with the outer damper part (52), one of said damper parts being stationary, while the other one is connected to the spindle (24), wherein the damper parts (52, 56) define at least one pair of cylindrical working surfaces positioned opposite each other a small distance apart so as to form therebetween a gap, and a viscous medium (58) occupies at least a part of this gap between these working surfaces, the radial dimension of at least one of the working surfaces varying in the direction of relative movement of the damper parts (52-56) so that the width of at least a portion of said gap that contains viscous medium (58) varies in the direction of relative movement, said viscous medium being a silicon grease.

* * * * *